April 5, 1960 R. W. KRAMER 2,931,447
DISK HARROW
Filed May 15, 1957 2 Sheets-Sheet 2
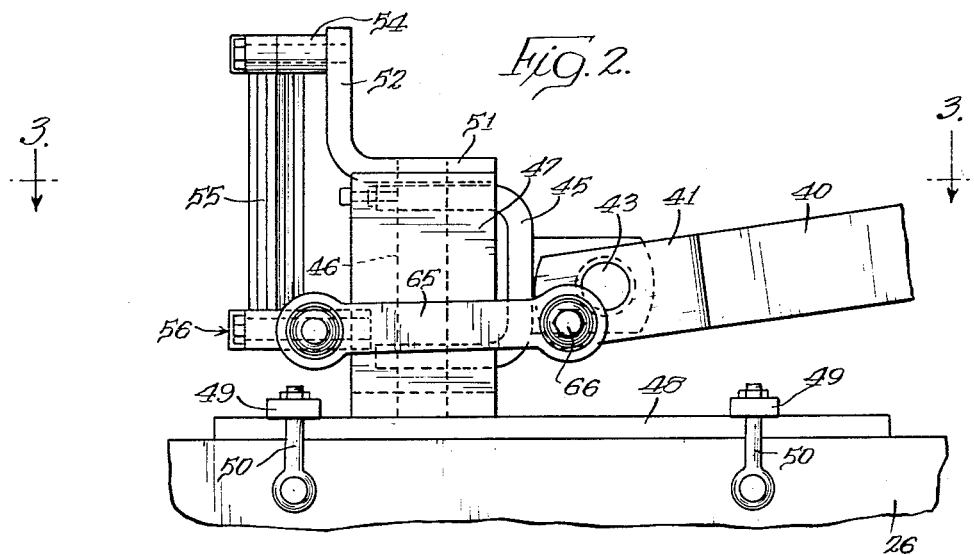
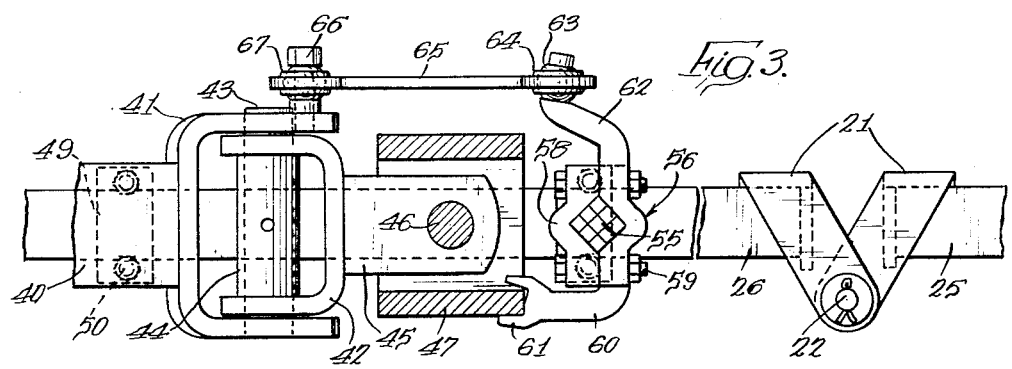
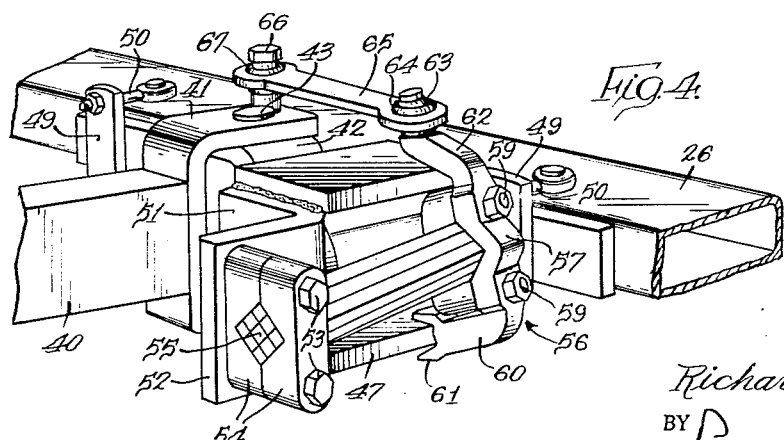
INVENTOR.
Richard W. Kramer
BY Paul O. Pippel
Atty.

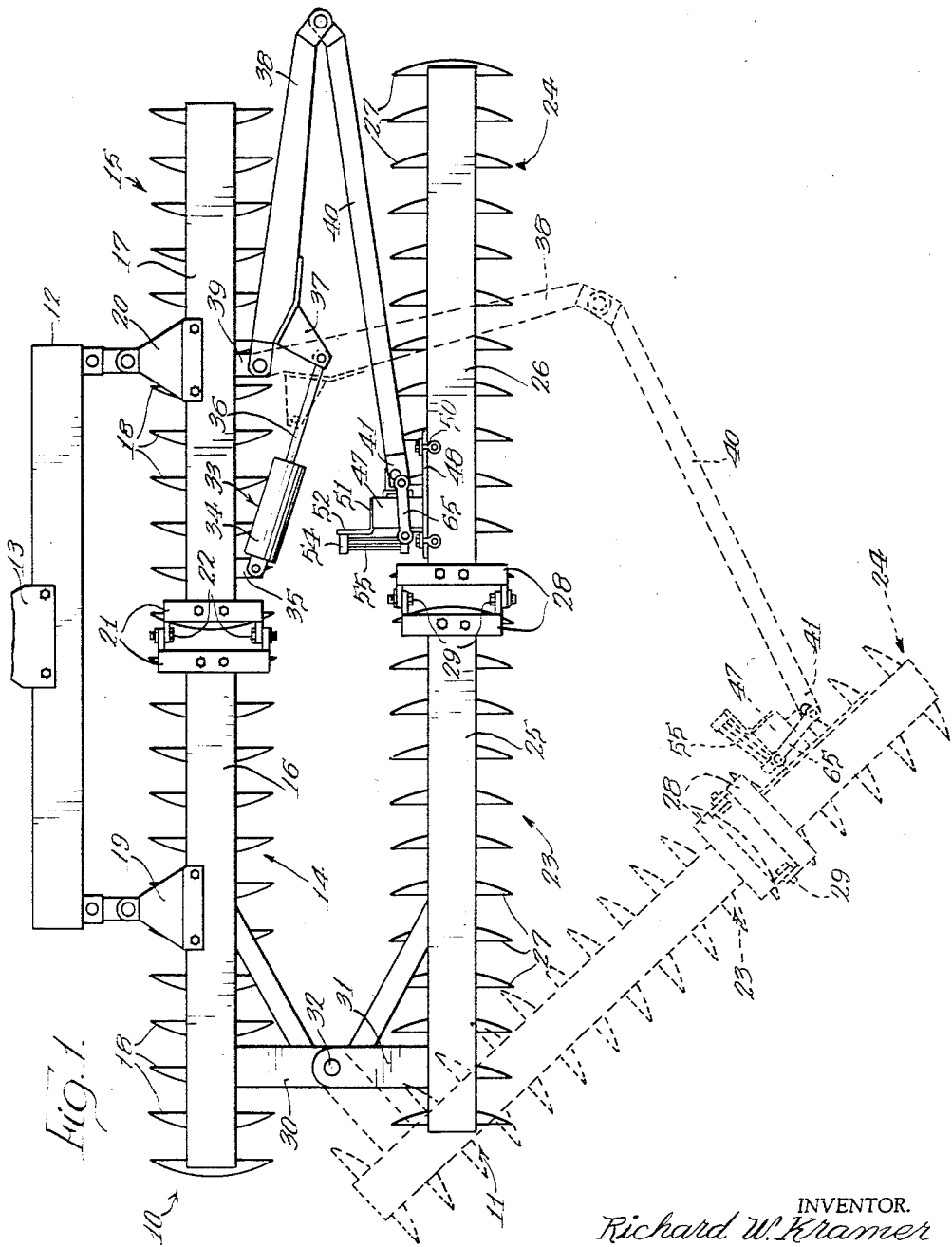

United States Patent Office 2,931,447
Patented Apr. 5, 1960

2,931,447

DISK HARROW

Richard W. Kramer, Modesto, Calif., assignor to International Harvester Company, Chicago, Ill., a corporation of New Jersey Application May 15, 1957, Serial No. 659,296

3 Claims. (Cl. 172—572)

This invention relates to harrows and particularly to disk harrows. More specifically the invention concerns a disk harrow of the offset type.

A conventional trail-behind offset disk harrow consists of front and rear sections connected at one end on a vertical axis for horizontal swinging between parallel, or transport, and angled or operating positions. The disks of one section have their concave sides facing in the opposite direction from the disks of the other section, and in operation torque forces acting on the disk gangs must be resisted by the connections therebetween.

For example, in a right-hand offset harrow the concavity of the disks of the front gang faces to the right and that of the rear gang faces to the left, and the concave end of each gang tends to dig deeper than the opposite end thereof. Thus, twisting forces are set up between the gangs of a harrow wherein the front gang of a right-hand offset disk harrow is subjected to forces which tend to rotate it to the right about a longitudinal axis, while the rear gang tends to rotate to the left about a longitudinal axis. These forces increase with the increase in working angle between the gangs.

In order to offset this tendency of the gangs to rotate in opposite directions about longitudinal axes it is necessary to overcome this tendency by the application of balancing torque forces between the gangs, and these torque forces must increase with the increase in working angle between the gangs, so as to insure that the implement will operate at a uniform depth of penetration of the disks.

The problem of the draft forces acting on the disks resulting in twisting strains on the harrow sections becomes more pronounced in the wide type of harrow wherein front and rear gang sections are widened by the addition of another disk frame or gang. Due to the necessity of operating on land of varying contour, the two front gangs and the two rear gangs are hinged together on horizontal axes therebetween, and the angling connection is made between the outer front and rear gangs.

The present invention has for its object the provision of a disk harrow having novel means for balancing the twisting forces acting on the disk gangs.

Another object of the invention is the provision of a novel torsion bar connection between the outer gang frames of a flexible offset disk harrow, adapted to yieldably resist the twisting forces acting thereon while permitting the harrow gangs to follow the contour of the ground.

A further object of the invention is the provision of novel means for balancing the twisting forces acting upon a harrow of the type referred to, wherein resistance to said forces automatically increases with the increase therein.

Other objects and advantages of the invention will become clear from the following detailed description when read in conjunction with the accompanying drawings, wherein:

Figure 1 is a plan view of a flexible wide angle offset disk harrow embodying the features of this invention showing the transport position of the implement, and indicating in dotted lines the angle between the front and rear sections when the implement is in operating position;

Figure 2 is an enlarged detail of the torsion bar connection between the outer gangs of the front and rear sections;

Figure 3 is a section taken on the line 3—3 of Figure 2; and

Figure 4 is a perspective view of the structure shown in Figures 2 and 3.

In the drawings the numerals 10 and 11 refer, respectively, to the front and rear sections of a disk harrow having a transversely extending draft bar 12 and a drawbar 13 adapted for connection to a tractive vehicle by which the implement may be propelled over the ground. The front harrow section 10 consists of two transversely aligned frames or disk gangs 14 and 15, the general construction of which is conventional, and are indicated diagrammatically in Figure 1. It may be noted, however, that the front gangs 14 and 15 include frame members 16 and 17, respectively, upon which are mounted a plurality of disks 18, the concave sides of which are directed to the right of the direction of travel in Figure 1.

The transverse draft bar 12 is pivotally connected at its ends to brackets 19 and 20 secured to the frame members 16 and 17. As is well understood in the art, the front disk frames or gangs 14 and 15 are flexibly connected to accommodate the front section of the implement to changes in ground contour, and the inner end of each of the frame members 16 and 17 has secured thereto a U-shaped member 21 extending longitudinally and hingedly connected by pivot pins 22.

The rear harrow section 11 comprises aligned left and right-hand disk gangs 23 and 24, which include aligned supporting frame members 25 and 26, respectively, each supporting a plurality of disks 27, the concave faces of which are directed to the left as viewed in Figure 1. The rear section 11 structure is substantially the same as that of the forward section and includes longitudinally extending U-shaped members 28 affixed to the inner ends of the frame members 25 and 26 and hingedly connected by longitudinally aligned pivot pins 29.

In the solid line position of Figure 1 the disk harrow of this invention is shown with the forward and rearward sections 10 and 11 parallel for transport purposes. Near the left-hand end of forward and rearward gangs 14 and 23 a pair of frame bars 30 and 31 are secured to and project horizontally longitudinally from the respective gang frame members 16 and 25, and are pivotally connected by a vertical pin 32 accommodating swinging of the rear section relative to the forward section to an operating position corresponding to that shown in dotted lines in Figure 1.

Control of the swinging of the gang sections 10 and 11 relative to each other to selected angular positions may be accomplished by any suitable means but preferably by means of a hydraulic ram 33 comprising a cylinder 34 pivotally mounted upon a lug 35 secured to and projecting rearwardly from the frame member 17, and a piston rod 36 pivotally connected to a lug 37 affixed to a horizontal link or bracing bar 38 pivotally mounted at one end upon a lug 39 also affixed to the frame bar 17 and extending rearwardly therefrom. Link or bar 38 is pivotally connected at its other end to another link or bracing bar 40 which is angled with respect to link 38 in a toggle arrangement and has affixed to its other end a yoke 41 which straddles another yoke 42 and is pivotally connected thereto for swinging in a horizontal plane by a vertical pivot bolt 43. A spacer is provided in the form of a sleeve 44 between the arms of yoke 42.

Yoke 42 is affixed to the end of a horizontal bar 45 mounted upon a longitudinally extending shaft 46 carried in a U-shaped housing 47 which is affixed to and projects forwardly from a plate 48 connected by a plurality of clamps 49 and eye bolts 50 to the right-hand rear frame bar 26.

An angle plate 51 is secured to the member 47 and supports one end of shaft 46. An arm 52 of the angle member 51 extends forwardly therefrom and is tapped to receive the threaded ends of a pair of vertically spaced bolts 53 upon which are mounted notched clamping elements 54 adapted to receive and confine one end of a torsion bar or spring 55.

The forward end of torsion bar 55 is anchored and held rigid by the clamping elements 54. Torsion bar 55 consists of a plurality of individual spring steel bars forming the square bar 55, the other end of which is securely held by a rockable clamp 56 having a notched portion 57 and a mating clamping element 58 also notched to receive therebetween the free end of the square torsion bar 55. Element 58 is secured to clamp 56 by a pair of bolts and nuts 59.

The lower end of clamp 56 has an extension 60 having a jaw portion 61 at its end straddling the edge of the lower portion of the U-shaped member 47, the thickness of which is less than the spread of the jaw member 61 to serve as a pivot point for the rocking of clamp 56.

The upper end of clamp 56 has a generally horizontal extension 62 provided at its upwardly bent end with a ball 63 pivotally receivable for universal movement in a socket 64 carried at one end of a transversely extending link 65, the other end of which is pivotally connected to a bolt 66 projecting upwardly from yoke 41, by a ball and socket connection indicated at 67.

At this point it should be clear that yoke 41 and link 40 are capable of swinging vertically relative to the rear gang frame 26 about the axis of longitudinally extending shaft 46 to permit the front and rear gangs to follow the contour of the ground and in response to the torque forces acting on the implement as it travels over the ground. The strain on the connections between the front and rear sections is relieved and these torque forces balanced by the torsion bar 55. Swinging of the rear harrow section 11 to the dotted line position of Figure 1 is accomplished by retraction of the piston rod 36 in the cylinder 34. This rocks link 38 about its pivot on the lug 39 in a direction to exert pressure rearwardly on link 40 and the rear section 11.

The operation of the flexible disk harrow of this invention should be clearly understood from the foregoing description. It should likewise be understood that the invention has been described in its preferred embodiment only, and that modifications may be made therein without departing from the spirit of the invention or the scope of the appended claims.

What is claimed is:

1. In an offset disk harrow including front and rear disk gang sections hingedly connected at one end for horizontal swinging between parallel or transport and relatively angled or operating positions, means controlling the angle between said gang sections and resisting torque forces thereon, comprising a pair of articulated links extending between the outer portions of said sections and pivotally connected thereto for horizontal swinging, the connection of one of said links to its associated gang section including a vertical pivot pin accommodating the horizontal swinging of said one of said links, means mounting said pivot pin on said gang section for vertical swinging of the pivot pin relative to said gang section about an axis generally perpendicular thereto, and means yieldably resisting the swinging of said pivot pin.

2. In an offset disk harrow including front and rear disk gang sections hingedly connected at one end for horizontal swinging between parallel or transport and relatively angled or operating positions, means controlling the angle between said gang sections and resisting torque forces thereon, comprising a pair of articulated links extending between the outer portions of said sections and pivotally connected thereto for horizontal swinging, the connection of one of said links to its associated gang section including a vertical pivot pin accommodating the horizontal swinging of said one of said links, means mounting said pivot pin on said gang section for vertical swinging of the pivot pin relative to said gang section about an axis generally perpendicular thereto, and means yieldably resisting the swinging of said pivot pin comprising a torsion spring generally perpendicular to said last mentioned gang section and generally parallel to said axis, and means operatively connecting said pivot pin to said torsion spring.

3. In an offset disk harrow including front and rear disk gang sections hingedly connected at one end for horizontal swinging between parallel or transport and relatively angled or operating positions, means controlling the angle between said gang sections and resisting torque forces acting thereon, comprising a pair of links pivotally connected together at one end extending between the outer portions of said sections for horizontal swinging therewith, means pivotally connecting the other ends of said links to its associated gang section including a vertical pivot pin connected to said one of said links and mounted on said associated gang section for vertical swinging about an axis generally perpendicular thereto, a torque bar anchored at one end to said associated gang section and generally parallel to said axis, means serving as a lever secured to the other end of said bar, and a link connecting said lever to one end of said pin to resist swinging of the latter about said axis.

References Cited in the file of this patent

UNITED STATES PATENTS

| | | |
|---|---|---|
| 2,339,124 | White | Jan. 11, 1944 |
| 2,604,746 | Frank et al. | July 29, 1952 |
| 2,795,911 | Rasmussen et al. | June 18, 1957 |
| 2,798,419 | Moriceau | July 9, 1957 |